Aug. 28, 1934.  P. SEITZ ET AL  1,971,878
AUTOMATIC WEIGHT RECORDING DEVICE
Filed Sept. 1, 1932  3 Sheets-Sheet 3
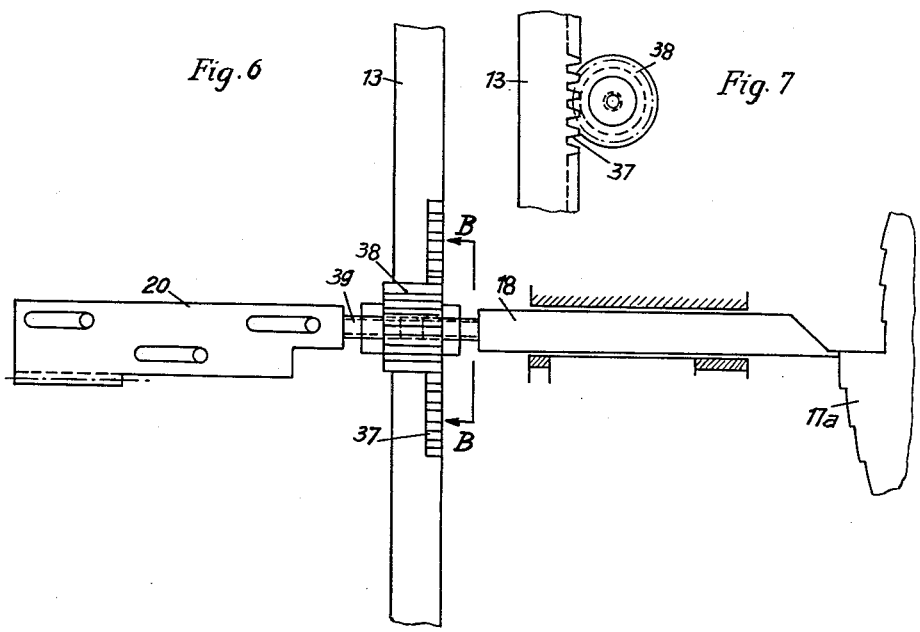
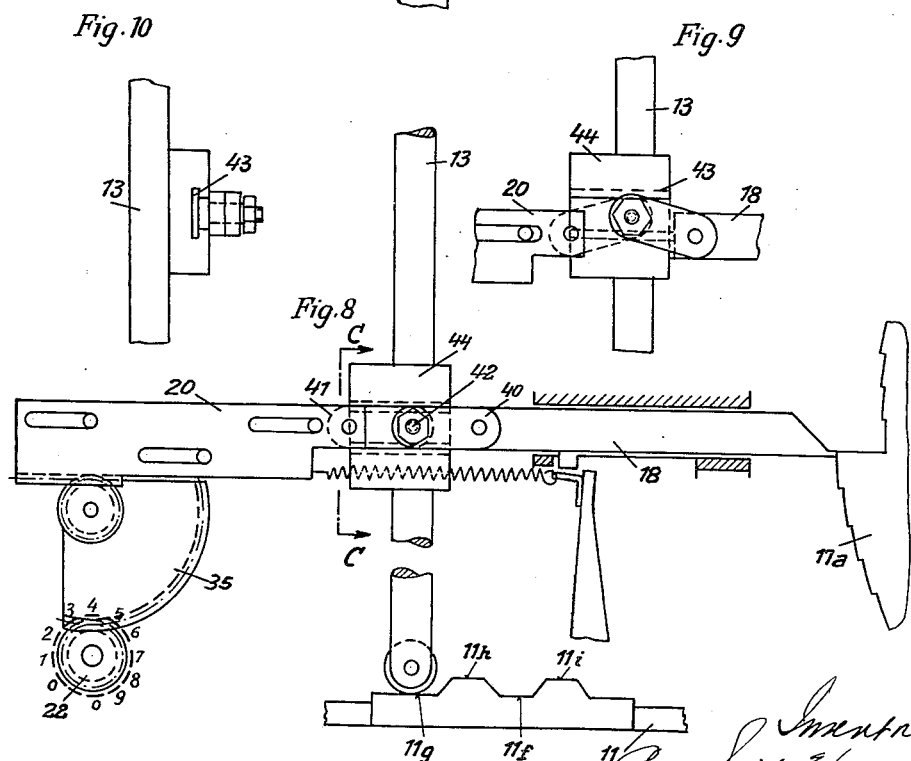

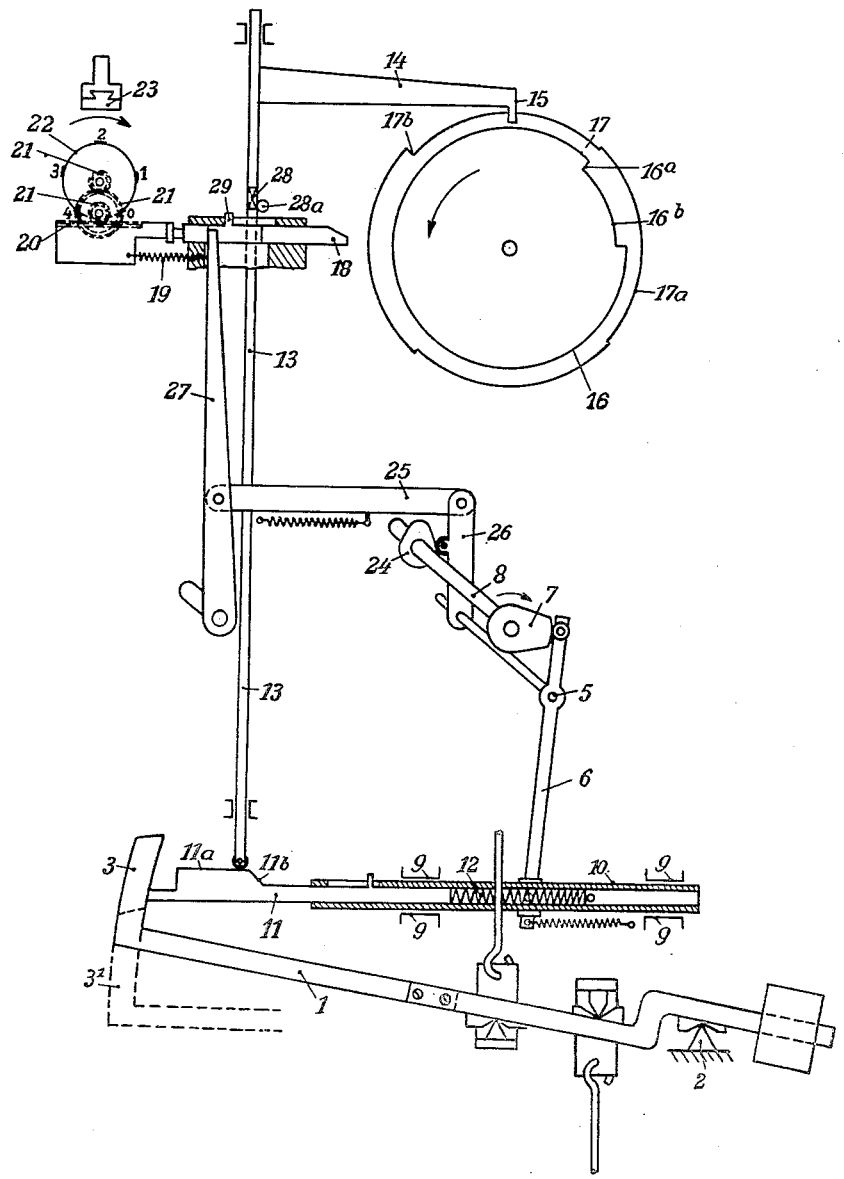

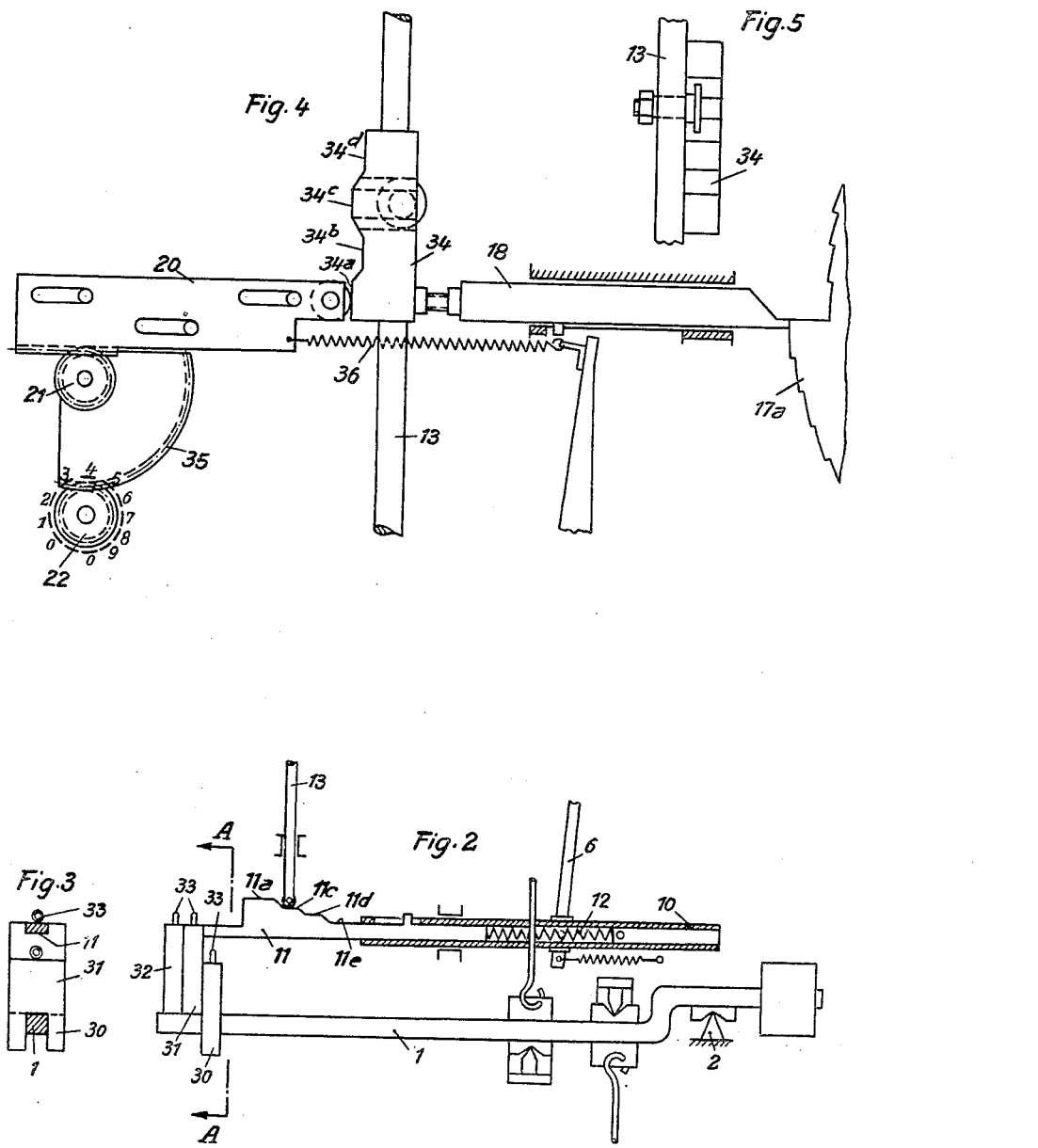

Patented Aug. 28, 1934

1,971,878

UNITED STATES PATENT OFFICE 1,971,878

AUTOMATIC WEIGHT RECORDING DEVICE

Paul Seitz and Wilhelm Depenbrock, Kreuznach, Germany, assignors to Seitz-Werke G. m. b. H., Kreuznach, Germany, a corporation Application September 1, 1932, Serial No. 631,428
In Germany May 16, 1930

11 Claims. (Cl. 265—6)

The present invention relates to an automatic weight recording device for use in a weighing machine and of the kind in which type discs or rollers are set by means of suitable gear mechanism, such as pinions and racks, through feelers co-acting with stepped discs in accordance with the weight imposed upon the machine.

In the case of weighing machines in which the point of maximum load on the indicating dial coincides with that of zero or no-load, the stepped discs cannot conveniently be provided with a step enabling the type discs or rollers positively to be set directly in accordance with the load at maximum loading, since that step would necessarily coincide with the zero step. In the case too of weighing machines adapted to be regulated by auxiliary means, such as weights, to increase the weighing range or capacity of the machine, when such weights are applied the steps on the stepped disc correspond to the actual load applied to the machine, minus the added weight. Consequently, in both these cases if the feelers project as far as the stepped discs in the normal manner, their stroke is erroneous in that the type discs become wrongly set, so that the resulting recording imprints do not correspond to the actual loading of the weighing machine.

The object of the present invention is to provide means for obviating the aforesaid defects whereby, when the load on the weighing machine is such that the stepped discs are unprovided with a corresponding step enabling the printing mechanism positively to be set directly in accordance with the maximum load, or a load according to the supplemented weighing range, some other moving member of the weighing machine can be set in conjunction with the stepped disc and the corresponding finger positively to bring the type discs into a position representing the actual applied load.

According to this invention in a weighing machine having type discs or rollers adjustable by means of a rotary stepped disc and an associated controlling finger, when the load placed on the machine is one for which there is no corresponding step on the stepped disc which would enable the printing mechanism to be set directly in accordance with the load, the type disc is set in a position corresponding to the actual load with the aid of an auxiliary controlling device acting on some other movable part of the machine.

Several constructional embodiments of the invention will now be described with reference to the drawings in which:

Fig. 1 shows in diagrammatic perspective view the improved weight recording mechanism and the relative parts of the printing mechanism of a weighing machine in which the maximum loading position of the recording mechanism coincides with the no-load or zero position thereof.

Fig. 2 is an elevational view of a modification of the invention applied to a beam type weighing machine in which the weighing range of the latter is varied as desired.

Fig. 3 is a section along the line A—A of Fig. 2.

Fig. 4 shows the parts of the printing control mechanism on a larger scale associated with the arrangement shown in Fig. 3.

Fig. 5 is a side elevation of a detail of the mechanism shown in Fig. 4.

Fig. 6 is a modified form of the mechanism shown in Fig. 4, also on a larger scale.

Fig. 7 is a side view of the vertically movable parts of Fig. 6.

Fig. 8 is a further embodiment of the printing control mechanism for a weighing machine adapted to be adjusted to varied weighing range.

Fig. 9 shows in detail an operative position of the mechanism shown in Fig. 8, and Fig. 10 is a side view of the vertically movable parts of Fig. 8.

Fig. 1 represents the essential parts of the beam weighing mechanism and printing mechanism of a weighing machine in which the point of maximum load (for example 400 kg.) on the dial corresponds with the no-load or zero position. Hence, if the weight indicator of this machine points to zero, one cannot tell whether the machine is not loaded at all or loaded to full capacity. Of course, only one step of the rotary stepped disc 17 comprising the control for the weight indicating machine corresponds to this position of the pointer, so that the imprint 0 is obtained whether the load is nil or 400 kg. This defect is obviated by the embodiment according to Fig. 1. The beam 1, which pivots on the knife edge bearing 2 is provided, on its outer end, with an upwardly curved extension 3. When the machine is in operation, the shaft 8, carrying two eccentrics 7 and 24, is turned in known manner (not shown in the drawings). The eccentric 7 deflects a rod 6 turning on the pivot 5, and thereby displaces towards the left the tube 10, which is adapted to slide in bearings 9. This tube houses a spring 12 and a feeler 11 disposed in front of the latter. The end of the feeler 11 is caused to bear against the curved extension 3 of the beam 1. In the case of loads smaller than the maximum, the movement of the feeler 11 towards the left is restricted by the extension 3, and the lost motion thus incurred is taken up by the compression of the spring 12 when the tube 10 is moved to the left by the lever 6. When maximum load is applied to the beam which then occupies the broken-line position 3', the feeler 11 is left free to move to the left.

When the shaft 8 turns, the eccentric 24 moves the finger 18 towards the right, through the agency of the levers 25, 26 and 27, until the finger engages with the corresponding step 17a on the stepped disc 17 with the aid of the tension spring 19. By means of the rack 20 and the pinions 21, the disc or roller 22 is thus rotated in such a manner as to bring one of the type characters 0, 1, 2 or 3—according to the load for the time being—into position facing the impression stamp 23.

For the purpose of bringing the type character 4 into the printing position, instead of the 0 character (which would be set in accordance with the stepped disc), when the load is the maximum of 400 kg. or over, an operating member which may comprise the drop bar 13 is provided. In the case of loads below the maximum, the lower end of this bar rests on a raised portion 11a of the feeler 11, and therefore cannot drop. With the maximum load, however, the beam 1 being then in the position 3' the feeler 11 in the movement of the tube 10 is pushed by the spring 12 towards the left, so that the bar 13 slides from the projection 11a down the ramp 11b. The bar 13 is provided with a stop 28, guided by the pin 28a, which is mounted on a suitable bracket (not shown) and when the bar 13 drops, the stop 28 comes into the path of the lug 29 which may be termed a blocking member carried by the finger 18 and arrests the movement of the finger. By these means, the type character 4 is correctly set—instead of the wrong character 0—when the maximum load is attained or exceeded.

The following arrangement is provided to ensure the accurate dropping of the bar 13 in the case of maximum load. An arm 14 on the bar 13 is provided with a nose 15, which slides over a control disc 16 attached to the stepped disc 17. This nose 15 drops into a recess 16b in the control disc, only when the load is at the maximum, i. e. the recess 16b is registered with the nose 15 only at this period. The edge 16a of the recess 16b is so disposed that the nose 15 reaches it at the moment when the finger 18 has passed over the edge 17b between the zero step and the highest step of the disc 17. This timing by means of the special control disc 16 and its recess 16b is necessary because the feeler 11 does not effect a sufficiently fine adjustment of the maximum load type character.

The feeling action for the purpose of timing the movement of the stop 28 need not be performed directly in conjunction with the beam 1, but may take place in a similar manner on any other moving parts of the weighing mechanism.

The result obtained with the arrangement according to the invention is not only that the type characters corresponding to the load are always brought into printing position in the case of a weighing machine of the beam type, in which both the recording device and those parts of the weighing mechanism by means of which the printing type is set, occupy the same position under maximum load and no-load, but also that by the aid of the same means, the higher weight totals in the case of a machine of variable weighing range are transmitted to the printing mechanism and imprinted thereby, as shown in Figs. 2–10 of the drawings.

In this embodiment of the invention the weighing mechanism is designed in substantially the same manner as in the embodiment already described. In Fig. 2 therefore, only the beam 1 and feeler 11 with the parts directly adjoining same are represented. As shown in Fig. 2 there are disposed at the end of the beam 1 a number of auxiliary weights 30, 31, 32—in place of the extension 3 in the machine according to Fig. 1—the weights being freely suspended by means of the eyes 33 and each representing a weight equivalent to the normal maximum weighing capacity of the machine. In order to increase the capacity of the machine one or more of the auxiliary weights 30—32 is or are lowered to rest as a rider on the beam 1. When the weight 30 is lowered on to the beam, in setting the printing mechanism, the feeler 11 which normally is restricted by contact therewith no longer strikes against the weight 30, but against the weight 31 situated further towards the left, so that the drop bar 13 descends from the step 11a to the step 11c of the feeler 11. If, in addition to the weight 30, the weight 31 and finally the weight 32 are placed on the beam 1, the feeler slides to a correspondingly greater distance towards the left, with the result that the bar 13 is lowered on to the step 11d and finally on to the step 11e.

As shown in Fig. 4 the bar 13 at its upper extremity carries an intermediate member 34 which passes between the finger 18 and the rack 20 by means of which, through the action of the pinion 21 and toothed quadrant 35, the type disc or roller 22 is adjusted. The intermediate member 34 is stepped, so that, in accordance with its vertical adjustment, consequent upon the vertical movement of the drop bar 13, the relative spacing of the finger 18 and rack 20,—which are drawn together by a spring 36—is modified. This modification of the overall length of the members 18, 34 and 20 between the stepped disc 17a and the pinion 21 of the printing mechanism, has the effect of moving the typewheel 22 onwards in order to present the latter.

It is assumed in this embodiment that the machine has, for example, a normal maximum load of 500 kg. In such case the intermediate member 34 has the form, shown in Fig. 4, for the triple change for setting the position of the type disc or roller 22 which comprises the hundreds unit of a four finger number index. When as shown in Fig. 4 the step 34a of the intermediate member 34 is in position between the finger 18 and the rack 20, none of the auxiliary weights 30—32 is imposed on the beam 1 and therefore the actual weights indicated on the dial of the machine are printed by the type characters of the type discs. If 500 kg. be added by placing the weight 30 on the beam 1, the step 34b of the intermediate member 34 is brought into position between the finger 18 and the rack 20, with the result that the type discs are set to a position exceeding the indication of the pointer by 500 kg. By adding the first and second weights 30, 31—that is, increasing the capacity of the machine by 1000 kg.—the impression, in the hundreds stage, naturally agrees once more with the indication given by the pointer. On this account, the step 34c of the intermediate member 34 has the same height as the step 34a.

In this case, all that is necessary is for the thousands unit disc of the index (not shown in the drawings) to be moved forward to the numeral 1. On the addition of 3 times 500 kg. the hundreds stage, i. e. type disc 22 is again set as for the addition of only one 500 kg. therefore the step 34d has the same width as the step 34b. In this case also, the thousands unit index disc must be advanced to the numeral 1.

To enable the intermediate member 34 to slide in accordance with the movement of the finger 18, it is slidable laterally on the bar 13, as represented in Fig. 5.

In the embodiment according to Figs. 6-10 it is assumed that for the position of the hundreds unit type disc 22 the steps on the feeler 11 have the form shown in Fig. 8, so that the step 11f, for a two-fold addition of 500 kg. weights is of the same height as the step 11g for no additional weight and that the step 11h for one additional weight is similar to the step 11i for three additional weights. As the result of the bar 13 being vertically adjusted accordingly, the pinion 38, arranged on the threaded spindle 39, is turned by the rack 37. The spindle 39 is provided with right and left-handed threads engaging the finger 18 and the rack 20, so that both these members are correspondingly drawn together or moved apart during the vertical adjustment of the bar 13.

According to Figs. 8-10, the finger 18 and rack 20 are connected together by means of a toggle lever 40 and 41. The distance between the finger 18 and the rack 20 naturally varies with the vertical position of the central pivot 42 which is carried by the drop bar 13. For adjusting the point 42 in the vertical direction, the pivot pin is guided, by means of a threaded stud, in a horizontal slot 43 in a sliding block 44 on the bar 13.

We claim:—

1. In a weighing machine of the weighing beam type, an automatic weight recording printng device comprising a type roller, a rotary stepped disc adapted to be rotated in accordance with the weight applied to the weighing beam, a reciprocatory member adapted to rotate said type roller in a movement normally limited by said stepped disc, an operating member adapted to co-operate with said reciprocatory member to set the type roller independently of said stepped disc, and means for controlling said operating member.

2. In a weighing machine of the weighing beam type, an automatic weight recording printing device comprising a type roller, a stepped disc adapted to be rotated in accordance with the weight applied to the weighing beam a reciprocatory member arranged to rotate said type roller in a movement normally limited by said stepped disc, a blocking member adapted to engage said reciprocatory member to set the type roller independently of said stepped disc, and means for controlling said blocking member from the weighing beam.

3. In a weighing machine of the weighing beam type, an automatic weight recording printing device comprising a type roller, a stepped disc adapted to be rotated in accordance with the weight applied to the weighing beam, a reciprocatory member arranged to rotate said type roller in a movement normally limited by said stepped disc, a drop bar adapted to move said reciprocatory member, a stop carried by said drop bar, a movable feeler adapted to engage the drop bar normally to arrest the drop bar and hold the stop out of the path of said reciprocatory member, and means for imparting movement to said feeler so that the drop bar is released and the stop carried thereby moved into the path of said reciprocatory member.

4. In an automatic weight recording printing device as claimed in claim 3, the provision of a projection secured to the weighing beam and adapted to engage the feeler to withhold the latter from movement until the maximum load of the weighing range is imposed upon said weighing beam.

5. In a weighing machine of the weighing beam type, an automatic weight recording printing device comprising a type roller, a gear train associated with said type roller, a rotary stepped disc adapted to rotate in accordance with the weight applied to the weighing beam, a movable substantially horizontal finger positioned to engage said stepped disc and provided with a threaded aperture, a movable substantially horizontal toothed rack member set to engage and rotate a member of said gear train and provided with a threaded aperture, a threaded connecting rod provided with threads of opposite rotation to engage the threaded apertures of the toothed rack member and movable finger respectively, a pinion fixedly mounted on said connecting rod, a drop bar, a toothed rack member secured to said drop bar and positioned so as to engage said pinion, and means for imparting motion to said drop bar in accordance to the variation in the weighing range of said machine.

6. In a weighing machine of the weighing beam type, an automatic weight recording printing device comprising a type roller, a stepped disc adapted to be rotated in accordance with the weight applied to the weighing beam, a reciprocatory member arranged to rotate said type roller in a movement normally limited by said stepped disc, a drop bar adapted to move said reciprocatory member, and means connected with the said reciprocatory member to move the type roller.

7. In a weighing machine of the weighing beam type, an automatic weight recording printing device comprising a type roller, a stepped disc adapted to be rotated in accordance with the weight applied to the weighing beam, a reciprocatory member arranged to rotate said type roller in a movement normally limited by said stepped disc, a drop bar adapted to move said reciprocatory member, and the type roller, a recessed disc adapted to rotate in concert with said stepped disc, and a finger associated with said recessed disc to control the movement of the drop bar.

8. In a weighing machine of the weighing beam type, an automatic weight recording printing device comprising a type roller, a stepped disc adapted to be rotated in accordance with the weight applied to the weighing beam, a reciprocatory member arranged to rotate said type roller in a movement normally limited by said stepped disc, a drop bar adapted to move said reciprocatory member, and the type roller, a substantially horizontal slidable feeler, stops carried upon the weighing beam adapted to engage with the said feeler, and a stepped cam member moved by this feeler and adapted to engage and support the drop bar.

9. In a weighing machine of the weighing beam type, an automatic weight according printing device comprising a type roller, a stepped disc adapted to be rotated in accordance with the weight applied to the weighing beam, a reciprocatory member arranged to rotate said type roller in a movement normally limited by said stepped disc, a drop bar adapted to move said reciprocatory member, and the type roller, means for controlling the drop bar, comprising a projection extending from said weighing beam, guide members, a substantially horizontal tube mounted in said guides, a feeler member slidably mounted in said tube and projecting therefrom, a spring housed in said tube to engage said feeler which normally is urged outwards to contact with said projection, and a stepped cam member carried upon the projecting portion of said feeler and adapted to engage and support said drop bar moved in accordance to the variation in the weighing range of said machine.

10. In a weighing machine of the weighing beam type, an automatic weight recording printing device comprising a type roller, a gear train associated with said roller, and including a reciprocatory rack, a rotary stepped disc adapted to be rotated according to the weight applied to the weighing beam, a reciprocatory finger adapted to engage the periphery of said stepped disc and move in accordance with the rotation of said stepped disc, a member adapted to vary the distance between said reciprocatory finger and rack, and means for actuating said last mentioned member in accordance with the variation in the weighing range of the machine.

11. In a weighing machine of the weighing beam type, an automatic weight recording printing device comprising a type roller, a stepped disc adapted to be rotated in accordance with the weight applied to the weighing beam, a reciprocatory member arranged to rotate said type roller in a movement normally limited by said stepped disc, a drop bar adapted to move transversely of said reciprocatory member, and a cam member connected with said drop bar having a plurality of steps and adapted to engage the adjacent extremity of the said reciprocatory member.

PAUL SEITZ.
WILHELM DEPENBROCK.